Dec. 18, 1928.
W. R. ROBINSON
VEHICLE WHEEL RIM
Filed June 10, 1924      3 Sheets-Sheet 1
1,696,015
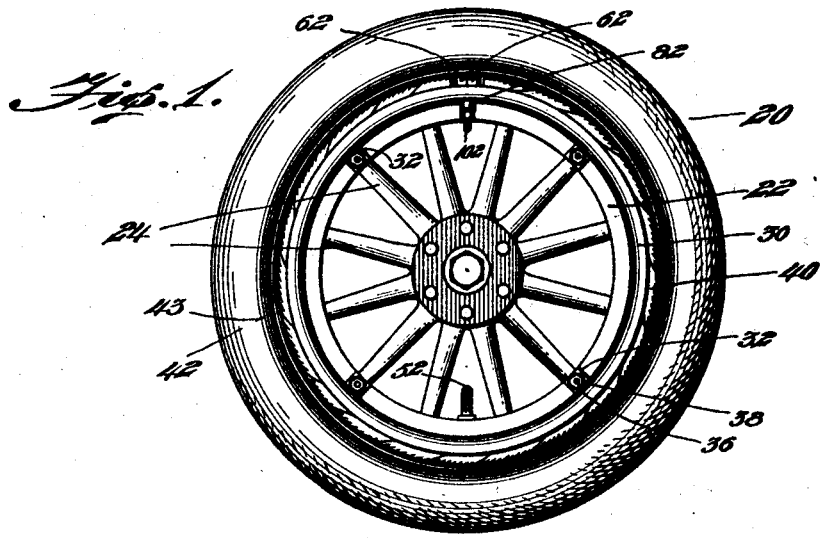
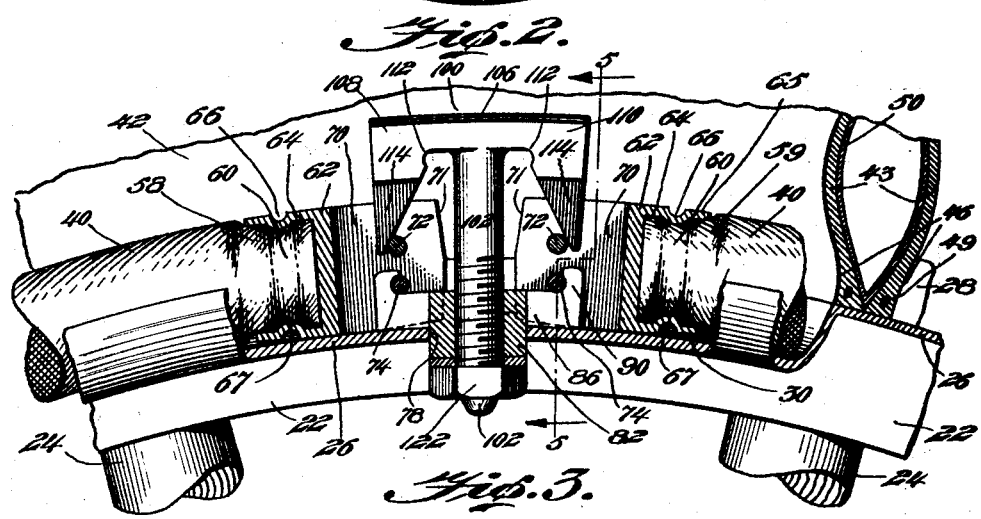
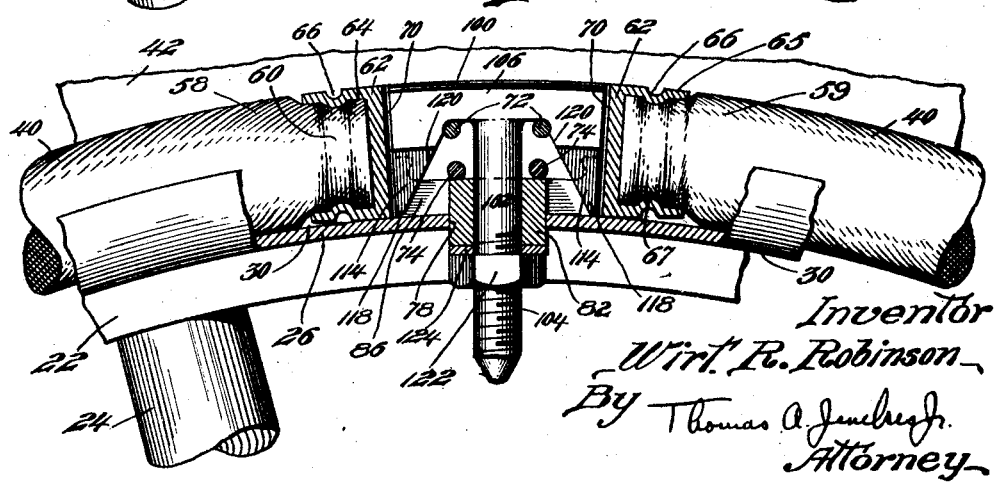
Inventor
Wirt R. Robinson
By Thomas A. Jembreg Jr.
Attorney Dec. 18, 1928.
W. R. ROBINSON
VEHICLE WHEEL RIM
Filed June 10, 1924   3 Sheets-Sheet 2
1,696,015
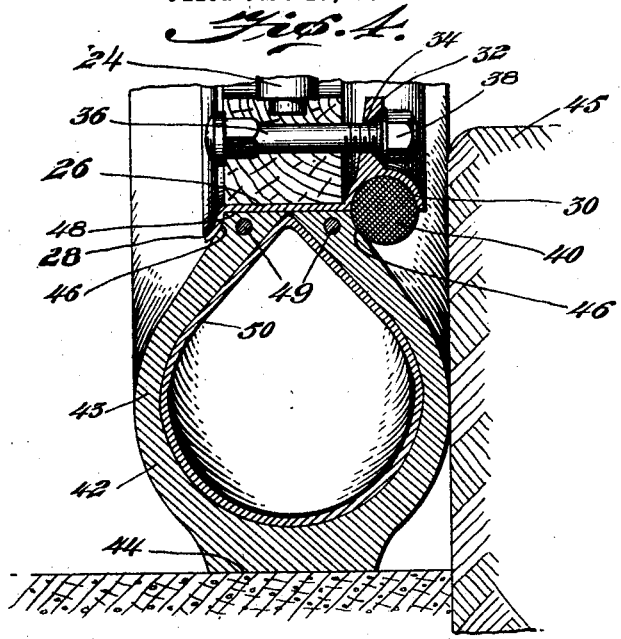
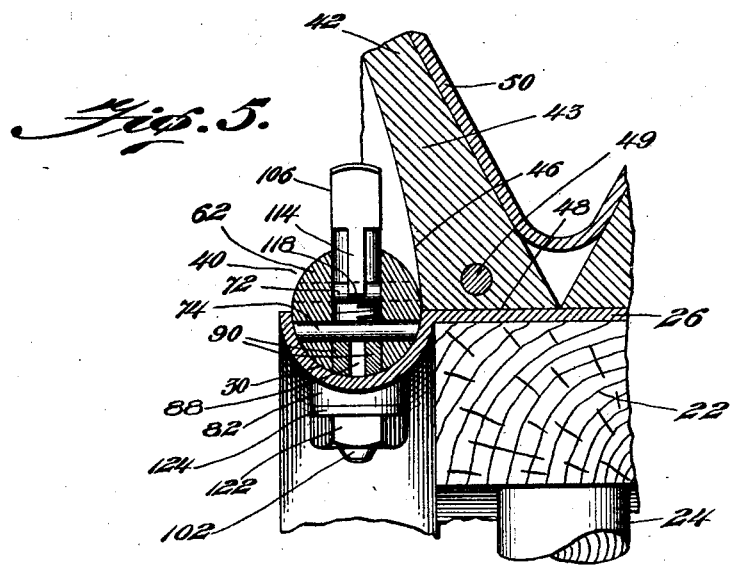
Inventor
Wirt R. Robinson,
By Thomas A. Jenckes Jr.
Attorney Dec. 18, 1928.
W. R. ROBINSON
VEHICLE WHEEL RIM
Filed June 10, 1924  3 Sheets-Sheet 3
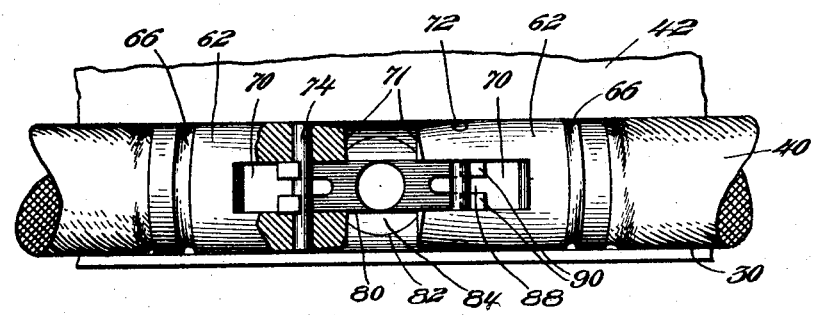
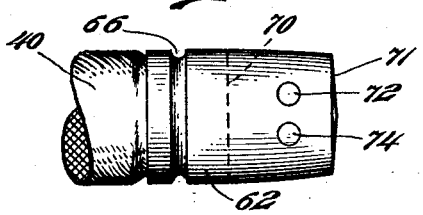 
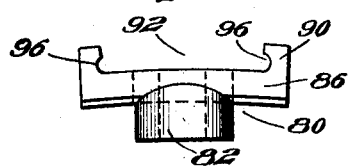 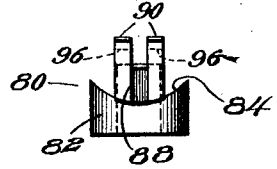
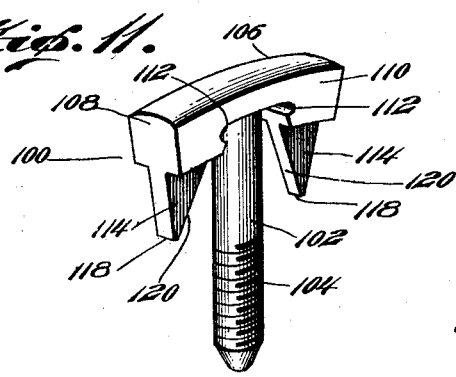
Inventor
Wirt R. Robinson
By Thomas A. Jenckes Jr.
Attorney Patented Dec. 18, 1928.

1,696,015

UNITED STATES PATENT OFFICE.

WIRT RUSSELL ROBINSON, OF PROVIDENCE, RHODE ISLAND.

VEHICLE WHEEL RIM.

Application filed June 10, 1924. Serial No. 719,156.

My invention relates to an improved type of means for attaching a detachable side flange or cable to the rim for locking the outer side of a pneumatic tire to the rim.

Objects of my invention are to provide an improved form of clamping or locking means having no moving or sliding parts and which will simultaneously stretch the ends of the flange into proper position and lock the ends of the flange together on the outside of a pneumatic tire. A further feature of my invention is to provide in combination with said means, means to hold the ends of a detachable side flange loosely together before contraction thereof around the rim and locking thereof.

These and such other objects of my invention as may hereinafter appear will be best understood from a description of one embodiment thereof such as is shown in the accompanying drawings in use with a balloon tire.

In the drawings, Fig. 1 is a side elevation of a vehicle wheel having a balloon tire attached thereto by means of my invention.

Fig. 2 is a detailed side elevation partially shown in section of the improved clamping and locking means, before depression of the T-bolt.

Fig. 3 is a detail side elevation partially shown in section after depression of the T-bolt and consequent locking of the ends of the detachable side flange in the flange seating portion.

Fig. 4 is a sectional view of a vehicle wheel having a balloon tire attached thereto by means of my invention adjacent to a curbing, showing how the balloon tire protects the flexible side flange and groove from contact with obstacles.

Fig. 5 is a detail sectional view taken along the line 5—5 of Fig. 2.

Fig. 6 is a plan view of the flexible side flange, flange-locking means and adjacent parts with T-bolt removed.

Fig. 7 is a detail side elevation of a cable cap.

Fig. 8 is a detail plan view of a cable cap.

Fig. 9 is a side elevation of the flange end retaining member.

Fig. 10 is an end view of the flange end retaining member.

Fig. 11 is a perspective view of my improved form of T-bolt.

In the drawings, wherein like characters of reference indicate like parts throughout, 20 generally indicates a vehicle wheel. The rim 26 or the outer periphery of the wheel where no separate rim demountable or otherwise is employed, is provided with the circumferential flange 28 extending radially outwardly from the inner edge thereof adapted to abut one side of a tire. The opposite or tire detaching edge of the rim 26 in the embodiment shown is provided with a depressed circumferential groove forming a seating portion 30 for a detachable-flange. In the embodiment, this groove is substantially semi-circular. As will be apparent this groove 30 provides a seating portion for a detachable flange, and as will also be apparent when a flexible detachable side flange such as a cable is employed with straight side tires as in my preferred embodiment shown, the preferable shape of this flange seating portion of the rim is a semi-circular depression as the groove 30 shown. In the embodiment shown the rim 26 is provided with lugs 32 projecting radially inwardly therefrom preferably from the groove 30. (Fig. 4). These lugs 32 thus project radially from the groove 30 and in no way interfere with the detachable features of the rim. Said lugs 32 are in the embodiment shown four in number, though it is obvious that this number may be varied without departing from the spirit of my invention. Said lugs 32 are provided with holes 34 adapted to receive the bolts 36 which normally project from the side of the wheel felly 22 and are adapted to be secured thereto by the nuts 38, though it is obvious that any other suitable means for demountably securing the rim 26 to the felly 22 may be employed, where the rim 26 is demountably attached to the wheel 20. In the embodiment shown the radial lugs 32 are set back from the outer edge of the groove 30, so that when in assembled position the nuts 38 are in turn protected by the groove 30.

Adapted to register in the detachable flange seating portion or groove 30 of the rim 26 in the embodiment shown is the detachable side flange 40. Said side flange 40 preferably comprises the flexible cable 40 made of wire or other flexible material, though it is obvious that as far as the novelty of my clamping means is concerned, any suitable type of detachable side flange 40 may be employed.

In the preferred embodiment shown, I employ a straight side balloon tire 42. As shown in Fig. 4 the ballooned sides 43 of said tires prevent any obstacles such as the curbing 45 from striking the flexible detachable side flange 40 and groove 30 thus insuring it against possible damage. As explained, I have shown the tire 42 having the straight sides 46 where they abut the attaching means thereof near the rim contacting edges 48 thereof.

In the preferred embodiment shown I provide means to detachably clamp the ends of said cable flange 40 within the flange seating portion 30 of said rim 26. And preferably I also secure said detachable side flange to said rim 26 against rotative movement therein. While any suitable type of locking means may be employed, in my preferred embodiment I have shown a specific form of clamping means which embodies certain features hitherto unknown in devices of this description. The ends 58 and 59 of said cable 40 are preferably circumferentially grooved as at 60 near their extremities. Cylindrical cap members 62, identical in construction for each end of the cable are provided. Said cap members 62 are preferably centrally chambered as at 64 from their cable attaching ends a distance inwardly. It is obvious that with this construction, the cap members 62 may be forced over the ends 58 and 59 of the cable and circumferentially grooved as at 66 near their extremities. It is obvious that the ridges 67 thus formed on the inner periphery of the grooves 66 of the shell 65 of the cap members 62 registering in the grooves 60 in the ends 58 and 59 of the cable 40 will suitably secure and retain the cap members 62 to the ends 58 and 59 of the cable 40. Said cap members 62 are also longitudinally slotted as at 70 a distance back from their contacting ends 71 (see dotted line in Fig. 7). The outer rods 72 and inner rods 74 are mounted near the contacting ends 71 thereof transversely of said longitudinal slots 70.

A radial hole 78 is provided in the groove 30 of the rim 26. Though the retaining member 80 about to be described is not essential for a proper functioning of my improved clamping means it is preferably employed where ease of assembly is desired. Said member 80 comprises a tubular shank 82, adapted to be inserted through said hole 78 in the groove 30 having its outer surface 84 suitably concaved to form a flush surface with the outer transverse surface of the groove 30, (Fig. 10) and an outer portion 86 provided with longitudinal slots 88 at each end thereof. The side portions 90 of said outer portion 86 have their outer sides centrally cut away as at 92 and at the extremities of said cut away portions 92 are provided with the transverse grooves 96 for a purpose to be described. The retaining member 80 may be detachably seated in the groove 30.

I will now describe the unitary means I employ to draw together the ends of said side flange 40 and to detachably lock them within the groove 30 of the rim 26. In my preferred embodiment this comprises the modified T-bolt 100. Said T-bolt comprises the usual shank 102, threaded as at 104 and the usual head 106. Said head 106 comprises the usual T-head portions 108 and 110 projecting laterally from said shank 102 at diametrically opposite sides thereof. Said head portions 108 and 110 are provided at the lower inside surfaces thereof near the shank with the grooves 112 extending transversely thereof. This construction will permit a locking registration of the transverse outer rods 72 or holes, where employed in the grooves 112 when once inserted therein. In addition as explained, I provide means unitary with the locking means to draw together the ends 58 and 59 of the detachable side flange 40 to seat them in locking position. In my preferred embodiment said means comprises lugs 114 projecting downwardly from each end 108 and 110 of the head 106 of the T-shaped bolt 100 preferably narrower than the head and bevelled towards the head from their ends 118 as at 120. It is obvious that as the shank 102 of said T-bolt 100 is drawn down that these bevelled surfaces 120 will contact the outer transverse rods 72 or apertures having abutments in the side walls thereof where employed thereby drawing the ends 58 and 59 of the detachable side flange 40 together until said apertures or outer transverse rods 72 are seated within said transverse grooves 112 thereby securely locking the ends of the side flange 40 together within the flange seating portion 30 of the rim 26. A nut 122 is provided for the shank 102 of said T-bolt 100, and the lock-washer 124 may be provided therefor if desired. It is obvious that as the lugs 114 are drawn down that they will register within the slots 88 of the outer portion 86 of the retaining member 82 thus assisting in securing said bolt against rotative movement.

The operation of my invention is obvious from the above description. Where a demountable rim construction is employed, the rim 26 with or without the tire 42 attached thereto may be slid over the felly 22, the bolts 36 projecting from the felly 22 registering in the holes 34 of the lugs 32 projecting radially inwardly from the groove 30. (Fig. 4). The rim 26 may then be demountably secured to the felly 22 by threading the nuts 38 on the projecting ends of the bolts 36. To remove the rim 26 with or without the tire 42 attached, a reversal of these operations is necessary. It is obvious that due to the construction I employ of having the demountable rim securing lugs 32 projecting from the flange seating groove 30 that the mounting of the rim in no way interferes with conveniently attaching the tire to the rim and vice versa, and that the groove 30 protects the bolts 36 and nuts 38.

Referring more specifically to the improved embodiment shown in the drawings employing my improved flexible detachable side flange 40 and improved means for detachably securing the ends thereof within the flange seating portion 30 of the rim, after the tire 42 has been placed on the rim 26, insert the tubular shank 82 of the retaining member 88 when employed if not already permanently attached within the groove 30 in the radial hole 78 in the flange seating portion 30. The flexible cable 40 is then inserted in the groove 30 and without any stretching thereof or great effort the inner transverse rods 74 thereof may be conveniently rested and retained within the transverse grooves 96 at the extremities of the cut away central portion 92 of the outer portion 86 of the cable end retaining member 80. The shank 102 of the T-bolt 100 is then inserted through the tubular inner portion 82 of the retaining member 80, or through the hole 78, the ends 58 and 59 of the cable being held in position by hand when the retaining member 80 is not employed, and nut 124 threaded thereon, the parts now assuming the approximate position shown in Fig. 2, the upper rods 72 resting against the lower portion of the bevelled surfaces 120 of the lugs 114. The nut 124 is then turned, thereby drawing the shank 102 of the T-bolt 100 down. The bolt 100 may however, be knocked into position by one sharp blow and the nut 124 threaded on later. This in turn pulls down the bevelled surfaces 120 and causes the outer transverse rods 72 to be drawn together, drawing the ends of the cable tightly together, until the outer transverse rods 72 sink into locked position in the transverse grooves 112 in the lower inside portions of the head 106 of the T-bolt 100, thereby locking the ends of the flexible detachable side flange 40 within the flange seating portion 30 of the rim 26. The tire may then be inflated and during use the parts will assume the position shown in Fig. 3. The lugs 114 registering in the slots 88 will assist in securing the parts in position.

To remove the tire 42 from the rim 26 after deflation thereof loosen the nut 124, if the T-bolt does not spring upward to the position shown in Fig. 2 strike the end of the shank 102 a sharp blow, causing the parts to resume the position shown in Fig. 2. The T-bolt 100 may then be removed, the inner transverse rods 74 lifted from the transverse grooves 96 and flexible side flange 40 detached from the flange seating portion 30, retaining member 80 removed and the tire 42 pulled off the rim 26.

It is obvious that I have provided a combined demountable and detachable rim of improved construction whereby the functioning of each part thereof interferes in no way with the other, that I have provided a vehicle wheel having a detachable side flange comprising a flexible member alone for the first time, means to detachably secure the ends of the flexible side flange within the flange seating portion of the rim, a unitary means for drawing together the ends of the detachable side flange and locking it within the flange seating portion and if desired to the rim, an improved form of T-bolt, and a vehicle wheel construction easy to assemble, sure in its action, easy to manufacture, and especially adapted for use with balloon tires.

I employ the word rim where a separate rim, demountable or otherwise is not employed to signify the outer periphery of the solid portion of the wheel.

I employ the word "cable" to signify any type of flexible detachable side flange, whether it be constructed of wire, strands, fibrous material or otherwise.

In the claims I employ the words "inner" and "outer" etc. to describe the position of the T-bolt when held head-up, regardless of any position it may assume in use on the wheel.

My invention is not limited except as claimed to the specific embodiments shown and various deviations may be made therefrom without departing from the spirit and scope of the appended claims.

What I claim as new and desire to secure by Letters Patent is:

1. In a vehicle wheel, having a rim having a seating portion for a detachable flange having a hole therein, a detachable side flange for said rim having apertures having abutments in the side walls thereof near its ends, and a T-shaped locking bolt having grooves extending transversely of the lower inner portion of the head thereof adapted to receive in the abutments in the side walls of said apertures said flange to detachably lock the ends of said flange therein and a shank portion adapted to project through said hole in said flange seating portion of said rim and to secure said detachable flange to said rim.

2. In a vehicle wheel, having a rim having a seating portion for a detachable flange having a hole therein, a detachable flange for said rim having apertures having abutments in the side walls thereof near its ends, and a T-shaped locking bolt having lugs projecting downwardly from each end of the head bevelled towards said head from the ends thereof and adapted to contact said abutments in the side walls of said apertures to draw the ends of said flange together within said flange seating portion, grooves extending transversely of the lower inner portion of the head thereof adapted to receive the abutments in the side walls of said apertures said detachable flange to lock the ends of said flange therein and a shank portion adapted to project through said hole in said flange seating portion of said rim and to secure said detachable flange to said rim.

3. In a vehicle wheel, having a rim having a seating portion for a detachable flange having a hole therein, a detachable side flange for said rim having its ends longitudinally slotted and having rods extending transversely of said slots, and a T-shaped locking bolt having grooves extending transversely of the lower inside portion of the head thereof adapted to receive said transverse rods to detachably lock the ends of said flange therein and a shank portion adapted to project through said hole in said flange seating portion of said rim to secure said detachable flange to said rim.

4. In a vehicle wheel, having a rim having a seating portion for a detachable flange having a hole therein, a detachable side flange for said rim having its ends longitudinally slotted and having rods extending transversely of said slots and a T-shaped locking bolt having lugs projecting downwardly from each end of the head thereof bevelled towards said head from the ends thereof and adapted to contact said transverse rods to draw the ends of said flange together, grooves extending transversely of the lower inside portion of the head thereof adapted to receive said transverse rods to detachably lock the ends of said flange therein and a shank portion adapted to project through said hole in said flange seating portion of said rim to secure said detachable flange to said rim.

5. In a vehicle wheel, having a rim having a seating portion for a detachable flange having a hole therein, a detachable side flange for said rim having its ends longitudinally slotted and having outer and inner sets of rods extending transversely of said slots, a T-shaped locking bolt having lugs projecting downwardly from each end of the head thereof bevelled towards said head from the ends thereof adapted to contact said outer transverse rods to draw the ends of said flange together, grooves extending transversely of the lower inside portion of the head thereof adapted to receive said outer transverse rods to detachably lock the ends of said flange therein and a shank portion adapted to project through said hole in said flange seating portion of said rim to secure said detachable flange to said rim and a retaining member having a shank adapted to register in the hole in said groove around the shank of the T-bolt and an outer portion longitudinally slotted and having its outer side transversely grooved to receive the inner transverse rods of said flange to firmly retain the ends of the flange together before depression of the T-bolt and means to lock said bolt to said rim.

6. In a vehicle wheel, having a rim having a seating portion for a detachable flange having a hole therein, a detachable side flange for said rim having its ends longitudinally slotted and having rods extending transversely of said slots, a T-shaped locking bolt having lugs projecting downwardly from each end of the head thereof bevelled towards said head from the ends thereof adapted to contact said transverse rods to draw the ends of said flange together and grooves extending transversely of the lower inside portion of the head thereof adapted to receive said transverse rods to detachably lock the ends of said flange therein, a shank portion adapted to project through said hole in said flange seating portion of said rim to secure said detachable flange to said rim and means to loosely retain the ends of said flange together before depression of the T-bolt.

In testimony whereof I affix my signature.

WIRT RUSSELL ROBINSON.